UNITED STATES PATENT OFFICE.

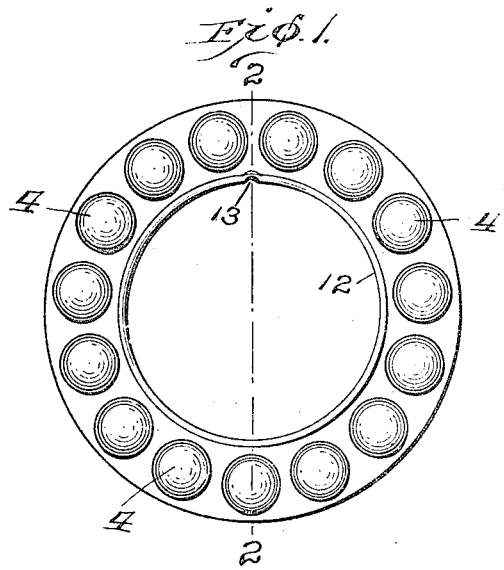
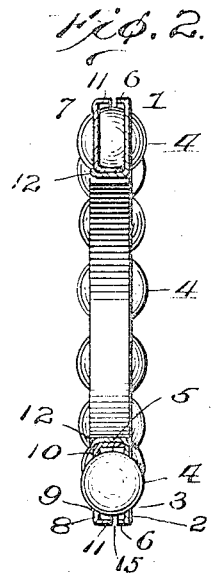
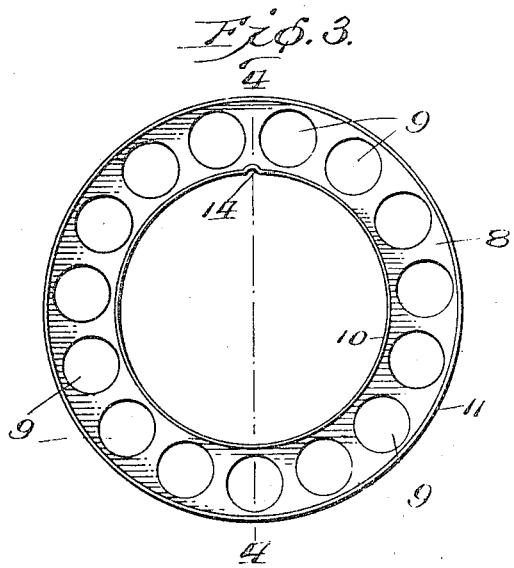
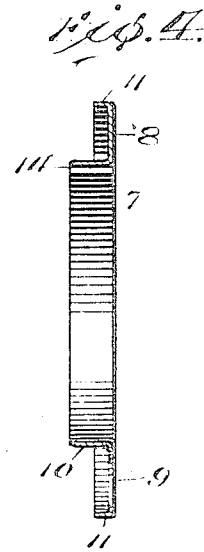

WINFIELD S. ROGERS, OF BANTAM, CONNECTICUT, ASSIGNOR OF ONE-HALF TO NELLIE M. SCOTT, OF BANTAM, CONNECTICUT.

BALL-BEARING.

1,182,796.  Specification of Letters Patent.  Patented May 9, 1916.

Application filed February 26, 1916. Serial No. 80,871.

*To all whom it may concern:*

Be it known that I, WINFIELD S. ROGERS, a citizen of the United States, residing at Bantam, in the county of Litchfield and State of Connecticut, have invented certain new and useful Improvements in Ball-Bearings, of which the following is a specification.

My invention relates to improvements in ball bearings, and it consists in the constructions, combinations and arrangements herein described and claimed.

An object of my invention is to provide an improved ball retainer for end-thrust bearings, which will minimize all danger of distortion or destruction under abnormal strains and conditions, and which will operate efficiently under all practical conditions of long continued use.

A further object of my invention is to provide a durable and inexpensive ball retainer, which will have a maximum of rigidity with a minimum of weight.

In the accompanying drawings: Figure 1 is an end view of one embodiment of my invention, with the balls shown in position therein; Fig. 2 is a section on the line 2—2 of Fig. 1; Fig. 3 is an end view of one of the annular members of U-shaped cross section, and Fig. 4 is a section on the line 4—4 of Fig. 3.

Referring to the drawings, 1 indicates an annular member of U-shaped cross section, having an annular radial web 2 provided with a series of apertures 3 for the balls 4, and formed with axial cylindrical flanges 5 and 6, respectively, on its inner and outer peripheries. A similar annular member 7 has an annular radial web 8 provided with apertures 9 for the balls 4, and formed with inner and outer cylindrical peripheral flanges 10 and 11; said annular members being advantageously stamped from sheet metal.

In assembling the members 1 and 7, the inner securing flanges 5 and 10 are telescoped and the inner flange 5 then expanded or spun over at 12 to rigidly clamp said annular members together along the inner peripheries of their apertured annular webs 2 and 8; thereby clamping said perforated annular webs under a strong tension which augments their rigidity and strength for efficiently resisting distortion under all practical conditions of use. The cylindrical flanges 6 and 11 extending axially from the outer peripheries of the perforated annular webs 2 and 8 rigidly confine said webs against any tendency to buckle under said strong clamping action on their inner peripheries; thereby insuring the maintenance of an advantageous tension on said perforated annular webs and providing a strong and rigid construction adapted to resist excessive and abnormal strains.

In the assembled position of the parts, a lubricating opening 15 is provided between the adjacent ends of the outer cylindrical flanges 6 and 11; said flanges being shorter than the inner cylindrical flanges 5 and 10. This provides a novel and highly advantageous construction, in which the rigidity of the apertured radial webs 2 and 8 is greatly augmented by the tension under which they are thus clamped; thereby eliminating danger of distortion and destruction of my improved retainer. The telescoping inner flanges 5 and 10 are provided with coöperating hollow ribs 13 and 14, which slidably interengage to insure registry of the series of ball apertures 3 and 9 and to positively lock the annular members 1 and 7 against relative rotation. The ribs 13 and 14 project from the outer peripheries of the respective telescoped cylindrical flanges to permit free passage for a shaft or other machine element, and are locked in interengagement by the swaging connection of the cylindrical flanges; said interengaged ribs acting to position and positively lock the telescoped flanges against relative rotation, and eliminating the defects found to exist where the frictional resistance incident to the swaging connection is utilized as the locking means in this construction.

I have illustrated and described preferred and satisfactory constructions, but changes could be made within the spirit and scope of my invention.

I claim:

1. A ball retainer comprising a pair of perforated annular webs provided on their inner peripheries with cylindrical flanges adapted to fit in close telescopic engagement and on their outer peripheries with shorter cylindrical flanges, said pair of telescopically engaged inner flanges being rigidly secured together with their ends in firm engagement about the inner peripheries of said perforated annular plates, and with said pair of outer cylindrical flanges spaced apart to provide an annular lubricating opening around the outer peripheries of said retainer.

2. A ball retainer comprising a pair of perforated annular webs provided on their inner peripheries with cylindrical flanges adapted to fit in close telescopic engagement and on their outer peripheries with shorter cylindrical flanges, said pair of telescopically engaged inner flanges being rigidly secured together with their ends in firm engagement about the inner peripheries of said perforated annular plates, and with said pair of outer cylindrical flanges spaced apart to provide an annular lubricating opening around the outer peripheries of said retainer, and said inner cylindrical flanges having interengaging means for positioning and positively locking said flanges against relative turning.

In testimony whereof I affix my signature in the presence of two witnesses.

WINFIELD S. ROGERS.

Witnesses:
G. AYRES,
M. J. HYDEN.